United States Patent Office 3,466,318
Patented Sept. 9, 1969

3,466,318
PROCESS FOR THE PRODUCTION OF 1-CYANO-1,3-BUTADIENE BY DEHYDROGENATION OF A 1-CYANOBUTENE
Arthur Lambert and George Kenneth Makinson, Manchester, England, and Arthur Hill, deceased, late of Wilmslow, Cheshire, England, by Dora Margaret Hill and Keith Alan Hill, joint administrators, assignors to Imperial Chemical Industries Limited, Millbank, London, England, a corporation of Great Britain
No Drawing. Filed Nov. 23, 1965, Ser. No. 527,401
Claims priority, application Great Britain, Nov. 24, 1964, 47,785/64
Int. Cl. C07c 121/30; B01j 11/32
U.S. Cl. 260—465.9                        9 Claims

ABSTRACT OF THE DISCLOSURE

A process for preparing 1-cyano-1,3-butadiene by dehydrogenating a 1-cyanobutene in the vapor phase at a temperature of from 300° C. to 550° C. The dehydrogenation is carried out in the presence of a catalytic amount of a catalyst selected from the group consisting of bismuth phosphomolybdate, mixed zinc and copper oxides and cobalt molybdate.

---

This invention relates to the manufacture of 1-cyano-1,3-butadiene (α-cyanoprene).

According to the present invention we provide a process for the manufacture of 1-cyano-1,3-butadiene by the catalytic vapour phase de-hydrogenation of cyanobutene at elevated temperature.

The process of our invention is applicable to any one of the isomeric cyanobutene. It is particularly suitable for coversion of the readily available 1-cyano-butene-2 to 1-cyano-1,3-butadiene (but is also applicable to 1-cyanobutene-1 and 1-cyanobutene-3). Moreover, mixtures of cyanobutenes may be used as the starting material. We have found, for example, that when 1-cyano-butene-2 is used as the starting material the product is a mixture of unchanged 1-cyanobutene-2, some isomeric 1-cyano-butene-1 and 1-cyano-1,3-butadiene. The mixture of isomeric cyanobutenes present in the product may be recycled over the catalyst to give further quantities of 1-cyano-1,3-butadiene.

The dehydrogenation is performed in the presence of a dehydragenation catalyst, which may be a catalyst known from the art to be useful for performing vapour phase dehydrogenations. Particularly suitable for the process of the invention are bismuth phosphomolybdate catalysts which may be supported on slica, mixed zinc oxide and copper oxide catalysts especially those modified with small amounts of a sodium compound (for example about 0.2% by weight) and which may be pelleted, for example, with the aid of graphite, and cobalt molybdate catalysts preferably supported on alumina.

Other suitable catalysts include bismuth tungstate, bismuth phosphate, bismuth molybdate, indium phosphate, sodium phosphomolybdate, oxides of tin, mixed oxides of tin and antimony, and mixed oxides of tin, antimony and molybdenum. They also include molybdenum or tungsten oxide activated with antimony, arsenic, tellurium or selenium, mixtures of ammonium phosphate with bismuth or iron phosphate, mixtures of oxides of phosphorus and bismuth with an oxide of at least one of iron, cobalt or nickel, copper oxide supported on alumina, and titanium dioxide with added ferric oxide and potassium carbonate.

The dehydrogenation may be performed for example by leading the cyanobutene in the gaseous phase, preferably in admixture with air or nitrogen or other diluent gas, over the catalyst at a high temperature at any suitable pressure.

Temperatures within the range 300° to 550° C. are suitable but temperatures within range 350° to 450° C. are preferred. Pressures round about that of the atmosphere are usually employed, but the pressure is not critical and lower or higher pressures may be used if desired.

The time of contact between the cyanobutene and the catalyst may be varied considerably and the optimum time depends of course to some extent on the catalyst and the operating temperature. Very short contact times necessarily result in low conversions and very long contact times may result in polymer formation from the 1-cyano-1,3-butadiene. Generally, contact times between 1 and 10 seconds are suitable.

1-cyano-1,3-butadiene is a useful starting material for the manufacture of polymers.

The invention is illustrated by the following examples.

Example 1

The catalyst consisting of granules of bismuth phosphomolybdate supported on silica was placed in a reactor which was heated to 400° C. and a gaseous mixture of 1-cyano-2-butene and air in the ratio of 30:70% by volume was introduced at such a rate that the exothermic dehydrogenation reaction temperature was maintained at 450° C. Contact time was 4 seconds. The gaseous reaction product was a mixture of 1-cyano-butene - 2,1-cyano-butene-1 and 1-cyano-1,3-butadiene and the yield of 1-cyano-1,3-butadiene based on cyano-butene converted was 68%.

Example 2

A catalyst, consisting of a mixture of cupric oxide, zinc oxide and graphite in the ratio of 40:55:5 in the form of pellets, was placed in a reactor and heated to 350° C., and a gaseous mixture of 1-cyano-2-butene and nitrogen in the ratio of 1:1 introduced employing a contact time of 7 seconds. The reaction product, a mixture of 1-cyanobutene-2,1-cyanobutene-1 and 1-cyano-buta-1,3-diene, was condensed.

The yield of 1-cyano-1,3-butadiene based on cyano-butene converted was 94%.

Example 3

The catalyst described in Example 2 was placed in the reactor and heated to 425° C. A gaseous mixture of 1-cyanobutene-2 and nitrogen in the ratio of 1:1 was introduced employing a contact time of 7 seconds.

The yield of 1-cyano-1,3-butadiene based on cyano-butene converted was 75%.

Example 4

The copper/zinc oxide catalyst used in Example 2 was replaced by pellets of cobalt molybdate deposited on alumina and the procedure of Example 2 was repeated.

The yield of α-cyanoprene based on cyanobutene converted was 85%.

Example 5

The bismuth phosphomolybdate catalyst used in Example 1 was placed in the reactor and heated to 525° C. A mixture of cyanobutene-2 and air in the ratio of 17:83 by volume was introduced at such a rate that the exothermic dehydrogenation temperature was maintained 550° C. Contact time was 5 seconds. The yield of cyano-butadiene based on cyanobutene converted was 59%.

Example 6

The bismuth phosphomolybdate catalyst used in Example 1 was placed in the reactor and heated to 400° C. A mixture of cyanobutene-2 and nitrogen in the ratio of 30:70 by volume was introduced at such a rate that the exothermic dehydrogenation temperature was maintained at 450–460° C. Contact time was 4 seconds. The yield of cyanobutadiene based on cyanobutene converted was 66.5%.

Example 7

The copper/zinc oxide catalyst used in Example 2 was placed in the eactor and heated to 400° C. A mixture of cyanobutene-2 and nitrogen in the ratio of 22:78 by volume was introduced to the reactor keeping the exothermic dehydrogenation temperature at 405–410° C. Contact time was 9 seconds. The yield of cyanobutadiene based on cyanobutene converted was 55%.

What we claim is:

1. A process for the manufacture of 1-cyano-1,3-butadiene which comprises dehydrogenating a 1-cyanobutene in the vapor phase at a temperature between 300° C. to 550° C. in the presence of a catalytic amount of a dehydrogenation catalyst selected from the group consisting of bismuth phosphomolybdate, mixed zinc and copper oxides and cobalt molybdate.

2. The process of claim 1 wherein said 1-cyanobutene is passed over the catalyst in admixture with a diluent gas selected from the group consisting of air and nitrogen.

3. The process of claim 1 in which the dehydrogenation is carried out at temperature within the range 350° to 450° C.

4. The process of claim 1 in which the catalyst is a bismuth phosphomolybdate catalyst.

5. The process of claim 1 in which the catalyst is a cobalt molybdate catalyst.

6. The process of claim 1 in which the catalyst is a mixed zinc oxide and copper oxide catalyst.

7. The process of claim 1 in which the time of contact between the cyanobutene and the catalyst lies within the range 1 to 10 seconds.

8. The process of claim 1 in which the cyanobutene is 1-cyanobutene-2.

9. The process of claim 1 in which mixed cyanobutenes present in the product are recycled over the catalyst.

References Cited

UNITED STATES PATENTS

| | | |
|---|---|---|
| 3,198,750 | 8/1965 | Callahan et al. __ 260—465.3 XR |
| 3,200,084 | 8/1965 | Callahan et al. __ 260—465.9 XR |
| 3,248,340 | 4/1966 | Callahan et al. __ 260—465.3 XR |
| 3,264,225 | 8/1966 | Callahan et al. __ 260—465.9 XR |
| 3,282,982 | 11/1966 | Callahan et al. ____ 250—465.3 |
| 3,309,325 | 3/1967 | Gasson et al. __ 260—465.9 XR |
| 3,347,902 | 10/1967 | Grasselli et al. ____ 260—465.9 |

JOSEPH P. BRUST, Primary Examiner